(No Model.)
H. G. MORRIS.
ELECTRIC METER.
No. 388,707. Patented Aug. 28, 1888.
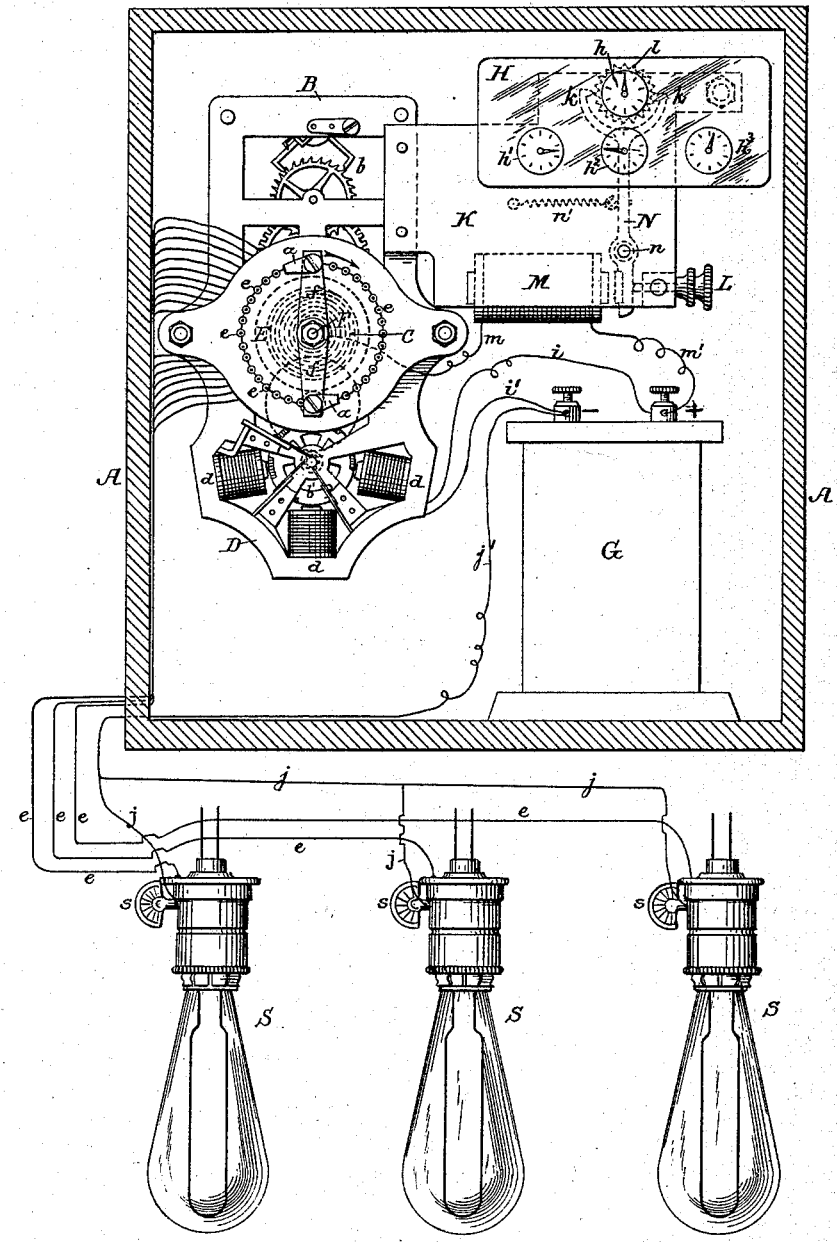
Witnesses:
Alex Barkoff.
David S. Williams
Inventor:
Henry G. Morris,
by his Attorneys.
Howson & Howson.

UNITED STATES PATENT OFFICE.

HENRY G. MORRIS, OF PHILADELPHIA, PENNSYLVANIA, ASSIGNOR TO THE GROVE ELECTRIC COMPANY, OF SAME PLACE.

ELECTRIC METER.

SPECIFICATION forming part of Letters Patent No. 388,707, dated August 28, 1888.

Application filed February 25, 1888. Serial No. 265,276. (No model.)

*To all whom it may concern:*

Be it known that I, HENRY G. MORRIS, a citizen of the United States, and a resident of Philadelphia, Pennsylvania, have invented certain Improvements in Electric Meters, of which the following is a specification.

My invention relates to certain improvements in that class of electric meters in which escapement-registering mechanism is operated by a magnet under control of a commutator connected to the various lamps in circuit, the object of my invention being to so construct such a meter that it will remain operative for long periods without requiring attention. This object I attain in the manner hereinafter described, reference being had to the accompanying drawing, which is a face view of an electric meter with my improvement, the casing of the meter being in section and a series of incandescent lamps being shown in connection with the meter.

A is the casing of the meter, within which is suitably supported a frame-work, B, having bearings for a shaft, F, which is driven by a spring, C, the speed of rotation of the shaft being governed by escapement mechanism $b$, of any ordinary character. The shaft F carries arms $f$, which have near the outer ends contacts $a$, which travel in a circular path over the face of a plate, E, and in this circular path are arranged the terminals of a number of wires, $e$, each of which constitutes one of the wires— say the positive wire—of a circuit containing the switch $s$ of an electric lamp, S, the negative wire $j$ of each circuit being connected by a common wire, $j'$, to the negative pole of a battery, G, contained in the casing of the meter. A positive wire, $m$, leads from the shaft F to one end of the coil of an electro-magnet, M, the other end of which is connected by a wire, $m'$, with the positive pole of the battery G, said magnet being carried by a plate, K, to a pin, $n$, on which is hung an armature-lever, N, acted upon by a spring, $n'$, and having its movement restricted by a stop-screw, L. The upper end of said armature-lever is forked and has tappets $k$, which engage with the pallets of a wheel, $l$, connected to the spindle of a registering-dial, $h$, which can be geared with the spindles of other dials, $h'$ $h^2$ $h^3$, by any of the forms of gearing common to registering apparatus of this class. When the switch $s$ of any lamp S is turned so as to put said lamp in the lighting-circuit, it at the same time closes the supplementary circuit through the wires $e\,j$; hence as the shaft F rotates the circuit through the magnet M will be completed whenever one of the contacts $a$ passes the terminal of a wire, $e$, of a lamp in circuit, and there will consequently be an operation of the armature-lever N and of the registering-dial $l$ on each closing of the circuit through the magnet M. When a lamp is out of the lighting-circuit, however, the switch of the same is so turned as to break the circuit through the wires $e\,j$; hence there will be no operation of the magnet when the contact $a$ of the commutator passes the terminal of the wire $e$ communicating with that lamp, so that the number of operations of the registering-dial on each rotation of the commutator-shaft will be dependent upon the number of lamps in circuit.

The objection to meters of this class as heretofore constructed has been that they required constant attention for the purpose of winding up the actuating-spring C of the commutator, for if this spring is kept within reasonable limits as to size it will only operate the commutator-shaft for a limited period. I therefore provide an electric motor for winding up the commutator-spring, which motor may be of any desired construction, that shown in the drawing having three electro-magnets, $d$, carried by a frame, D, and acting upon a rotating armature, $b'$, the shaft of which is connected by suitable gearing to the shaft of the spring C, so that the latter will always be kept under certain tension by the action of the motor. The motor is in the present instance driven by the same battery, G, which operates the meter, wires $i$ $i'$ forming connections between the motor and the positive and negative poles of the battery. A separate battery may, however, be used for operating the motor, if desired. It will be evident that by this means the objection to the ordinary meter which I have above alluded to is effectually overcome, as the spring C is continually kept under tension so long as the battery which operates the electric motor is in active condition, and these batteries are such as to require renewal only at long intervals.

Having thus described my invention, there- fore, I claim and desire to secure by Letters Patent—

1. The combination, in an electric meter, of the registering mechanism, a magnet for actuating the same, a commutator controlling the said magnet and having independent terminals connected to the different lamps of the system, an actuating-spring for said commutator, an electric motor, and winding-gear operated thereby and connected to the commutator-actuating spring, all substantially as specified.

2. The combination, in an electric meter, of registering mechanism, a magnet for actuating the same, a commutator controlling said magnet and having independent terminals connected to the different lamps of the system, an actuating-spring for said commutator, an electric motor and winding-gear operated thereby and connected to the commutator-actuating spring, and a single battery supplying the circuits both for the register-operating magnet and for the winding-motor, all substantially as specified.

In testimony whereof I have signed my name to this specification in the presence of two subscribing witnesses.

HENRY G. MORRIS.

Witnesses:
HENRY HOWSON,
WILLIAM D. CONNER.